United States Patent Office 3,028,347
Patented Apr. 3, 1962

3,028,347
POLYSILOXANE COATING COMPOSITION CONTAINING SILICEOUS ESTER AND ARTICLE COATED THEREWITH
Pierre Jean Chevalier, Lyon, France, assignor to Société des Usines Chimiques Rhone-Poulenc, Paris, France, a French body corporate
No Drawing. Filed July 31, 1959, Ser. No. 830,731
Claims priority, application France Aug. 5, 1958
5 Claims. (Cl. 260—18)

The present invention relates to colourless varnishes intended to protect the most varied paints against weather influences, the action of water and ultra-violet rays and to enable them to be cleaned by means of solutions of wetting agents or caustic alkali solutions such as are commonly employed for cleaning purposes.

It is a known fact that the majority of the paints employed for the protection of various supports (e.g. wood and metal) deteriorate more or less rapidly under the action of atmospheric agencies and of various foreign substances (e.g. soot, tar emanating from the combustion of organic materials, and chemical agents). This corrosive action is particularly marked in the case of paints applied to metals, because the majority of film-forming agents, (such as vegetable oils, phenoplast and aminoplast resins, alkyd and vinyl resins and the like, and cellulose ethers or esters) do not adhere so well to the latter supports as to wood, for example. This is one of the reasons why paints intended for the protection of metal are generally applied over an undercoat intended to improve the adhesion of the paint itself.

Despite the use of this intermediate coat, it is found that paints undergo a change of hue in the course of time, their gloss disappearing at the same time. At a more advanced stage, it is found that the pigments tend to separate from the film-forming element (powdering), which results in their progressive elimination under the action of weather influences. In addition, as a result of the contractions and expansions produced by temperature variations, the film-forming element cracks and then flakes, with the result that the paint becomes detached at various points and finally entirely disappears.

One of the objects of the invention is to prolong the life of paints, more especially those applied to metals, by increasing their resistance to atmospheric agents, and another is to enable them to be washed with aqueous solutions of detergents or alkaline products. Other objects will appear hereinafter.

The varnishes of the present invention comprise (a) 30–60% of at least one organopolysiloxane resin in the partially condensed state having a mean R/Si ratio, i.e. the ratio of the number of hydrocarbon groups to the number of silicon atoms, of 1.2–1.6 and containing an average of 0.5 to 2.5% of hydroxyl groups, (b) 1–25%, preferably 5–15%, of a methyl or ethyl ester of orthosilicic acid in the form of a monomer and/or polymer, (c) 1–20% of at least one organic solvent-soluble titanic or zirconic ester or condensation product of a titanic or zirconic ester, (d) 0–20% of an organic solvent-soluble organic zinc salt, and (e) at least 15% of a solvent for all of the above.

(All proportions and "parts" in this specification are by weight, unless otherwise stated).

The organopolysiloxane must be partially condensed, i.e. they contain besides the —Si—O—Si chains, hydroxyl groups attached to silicon, the proportion of which, calculated on the dry resins, is 0.5–2.5. They may also contain a proportion of —Si—Si— and —Si—CH$_2$—Si— groups. The hydrocarbon groups attached to the silicon in the resins may be of very varied nature, for example they may be alkyl groups, such as methyl, ethyl and butyl, or aryl groups, such as phenyl.

The silicic esters suitable for carrying out the invention are necessarily methyl or ethyl esters. Esters of alcohols containing more than two carbon atoms give varnishes whose drying time is too long. Either monomeric orthosilicates or polysilicates may be employed. The alkoxy/silicon numerical ratio is preferably between 2.3 and 4, the higher the value, the longer being the shelf life of the varnish.

The combination of the siliceous derivatives is preferably so chosen that the overall R/Si ratio is between 1 and 1.3.

The titanic or zirconic esters employed must be soluble in the solvents chosen for the compositions. Monomeric titanic esters, especially of alcohols containing 2–18 carbon atoms (such as isopropyl, butyl and octyl titanates) or polymers thereof (obtained, for example, by polycondensation of the monomeric esters with the aid of acetic acid or acetic anhydride) are generally quite suitable.

The zirconic esters employed may be either monomers of the type Zr(OR)$_4$ (in which R represents an alkyl group which may contain from 2 to 18 carbon atoms) or condensation products of the latter obtained, for example, by the action of acetic acid on the monomeric esters. These esters may advantageously be prepared by reacting zirconium tetrachloride with an alcohol in the presence of anhydrous ammonia. The products may be used either in the pure state or after dilution with solvents such as for example as benzene, toluene or alcohols.

The preparation of the compositions of the invention affords no particular difficulty. When zirconic esters are employed, it is preferred to add the mixture of organopolysiloxane resins and silicic esters in solution in an organic solvent to the heated mixture of zirconic esters and zinc salt (when used) diluted in a solvent such as an alcohol.

The proportions of the various constituents of the mixture may vary within the limits set out above in accordance with the properties which it is desired to impart to the varnish, such as hardness, drying time, and stability during storage. The proportion of solvent must be at least 15%.

The shelf life of the varnishes of the invention is a function of the nature and proportions of the mixture; it is an advantage of the inventions that varnishes can be obtained thereby which are stable for at least 3 months.

As has been stated in the foregoing, the varnishes of the invention are particularly suitable for the protection of paints applied to metal supports (e.g. doors, shutters, ships' hulls) though they are also applicable to paints applied to for example wood, or plastics. Varnishes containing zirconium are particularly suitable for applying to pale paints as they have no tendency to yellowing.

The following examples illustrate the invention:

*Example 1*

To a mixture comprising 346 parts of a methyl polysiloxane resin having a CH$_3$/Si ratio of 1.5 in a 60% solution in mineral spirit (boiling point: 93–114° C.) containing about 0.3% of hydroxyl groups in relation to the resin, and 387 parts of a methyl polysiloxane resin having a CH$_3$/Si ratio of 1.3 in a 60% solution in toluene, containing 3.2% of hydroxyl groups, are added at room temperature 128 parts of methyl polysilicate having an OCH$_3$/Si ratio of 3, and 101 parts of zinc 2-ethylhexanoate, in solution in white spirit containing 8% of zinc.

The solution obtained is heated to about 80° C., and 38 parts of a 50% solution in butyl acetate of a butyl polytitanate whose titanium content is 22.4% are added thereto. Heating is continued for 1 hour and a clear liquid of low viscosity is obtained. This liquid, when kept in a stoppered bottle at ambient temperature and in the absence of moisture, shows no trace of gelling 3 months after its preparation.

The solution is applied to a steel plate covered with a 1/10 mm. thick layer of a paint having a linseed oil base. The coating obtained does not retain dust after drying for 20 minutes at ambient temperature. The hardness, determined by the Wilkinson chalk method, is between H and 2H after eight days. When exposed to weather influences, the varnished paintwork exhibits no deterioration after 6 months.

By way of comparison various mixtures were prepared, in which one of the constituents of the preceding composition was omitted.

(a) In the absence of methyl polysilicate, it is found that the mixture gels in less than 1 hour and therefore cannot be used.

(b) In the absence of butyl polytitanate, a varnish is obtained whose drying period is 3 hours and whose hardness reaches only 4B after 1 week, which is insufficient for practical purposes.

(c) Omission of zinc 2-ethyl-hexanoate gives, after application to the support, a film of cloudy appearance, the hardness of which reaches only 3B after 1 week.

(d) If, instead of the mixture of the two described resins, only that containing 0.3% of hydroxyl groups is employed, a varnish is obtained which cracks after having been exposed to the external atmosphere for 2 to 3 weeks.

*Example II*

The following constituents are mixed at room temperature in the order given:

| | Parts |
|---|---|
| 60% solution of a methyl polysiloxane resin having a $CH_3/Si$ ratio of 1.5 (as used in Example I) | 320 |
| 60% solution of a methylpolysiloxane resin having a $CH_3/Si$ ratio of 1.3 | 360 |
| Methyl orthosilicate | 185 |
| Zinc 2-ethyl-hexanoate (as used in Example I) | 87 |
| Polymeric butyl titanate | 48 |

The mass thickens progressively and then it becomes fluid again. It can be kept for more than 1 year in fluid-tight receptacles without deteriorating. The liquid is applied by means of a brush to paint having a linseed oil base. The coating obtained is not sticky after 35 minutes. Hardness: H after eight days. The coated paintwork is intact after exposure to weather influences for 6 months.

*Example III*

There are employed a methyl phenyl polysiloxane resin $(CH_3+C_6H_5)/Si$ ratio$=1.5$, $C_6H_5/Si$ ratio$=0.3$,
$$OH=0.5\%$$
and a methyl polysiloxane resin $CH_3/Si$ ratio$=1.5$, $OH=1\%$, possessing —Si—Si— bonds, obtained in accordance with French Patent 1,081,726.

A mixture is prepared from the above constituents:

| | Parts |
|---|---|
| Methylpolysiloxane resin having Si—Si bonds in 60% solution in white spirit | 480 |
| Methyl phenyl polysiloxane resin in 70% solution in toluene | 160 |
| Methyl polysilicate (as used in Example I) | 170 |
| Zinc 2-ethyl-hexanoate (as used in Example I) | 90 |
| Butyl polytitanate solution in butyl acetate (as used in Example I) | 100 |

After heating under reflux for 8 hours, this mixture gives, when applied to a paint, a glossy varnish which is non-tacky after 15 minutes and reaches a hardness of from H to 2H after exposure to the external atmosphere for 1 week. After having been exposed to weather influences for 1 year, the varnish shows no sign of deterioration.

The stability of the mixture when kept in a stoppered receptacle in the absence of moisture is more than 6 months.

*Example IV*

A varnish is prepared from the following constituents:

| | Parts |
|---|---|
| 70% solution in white spirit of methyl polysiloxane resin ($CH_2/Si$ ratio$=1.3$) containing 1.67% of hydroxyl groups | 660 |
| Methyl polysilicate (as used in Example I) | 171 |
| Zinc 2-ethyl-hexanoate (as used in Example I) | 131 |
| Polymeric butyltitanate (as used in Example I) | 38 |

The limpid liquid obtained when applied to a linseed oil paint is dry after 30 minutes. After 1 week its hardness is 1H. When exposed to weather influences, it exhibits no trace of cracking after 6 months.

It is also found that the liquid has not changed in storage after the same period of time.

*Example V*

To a mixture of 32 parts of a 60% solution in mineral spirit (B.P. 93–114° C.) of methylpolysiloxane resin having a $CH_3/Si$ ratio of 1.5 and containing about 0.3% of hydroxyl groups calculated on the resin with 32 parts of a 60% solution in toluene of a methylpolysiloxane resin having a $CH_3/Si$ ratio of 1.3 and containing 3.02% of hydroxyl groups, are added 7.5 parts of ethyl disilicate and then 12.5 parts of a 50% solution in butyl acetate of a butyl polytitanate whose titanium content is 22.4%. The mixture is heated for 1 hour at 80° C. and there is obtained after cooling a clear liquid having a faint yellow colour, which remains stable in storage for 3 months.

A varnish obtained by diluting 80 parts of this product with 20 parts of kerosene is applied to a steel plate covered with a coat of paint based on linseed oil, and a dry coating is obtained after 2 hours.

The resistance of the coating to cracking is determined by the following method: The metal plate covered by the paint protected by the varnish, maintained in the moist state by sprinkling with water every two hours, is subjected to the action of an ultra-violet lamp for a period of 9 hours. At the end of this time it is cooled in a refrigerator at a temperature of +5° C. for 15 hours. This treatment is repeated until cracks appear in the surface of the coating.

This test is also carried out with a composition containing, to 100 parts of product prepared as above, 5 parts of a 50% solution of zinc 2-ethyl-hexanoate in white spirit.

With these two compositions, the resistance to cracking is maintained for more than 400 hours.

*Example VI*

100 parts of a 60% solution in toluene of methylpolysiloxane resin having a $CH_3/Si$ ratio of 1.3 and containing 3.2% of hydroxyl groups, 100 parts of a 60% solution in mineral spirit (boiling point: 93–114° C.) of methylpolysiloxane resin having a $CH_3/Si$ ratio of 1.5 and containing 0.3% of hydroxyl groups, and 18.6 parts of ethylpolysilicate having an $OC_2H_5/Si$ ratio of 3 are mixed at room temperature. The solution obtained is run into a mixture heated at 110–115° C. of 25.4 parts of butyl zirconate (containing 23.6% of zirconium), 28.8 parts of butanol and 22.8 parts of a zinc 2-ethylhexanoate solution in white spirit containing 8% of zinc. A clear liquid is obtained, which remains stable for 3 months. This liquid, when brushed on to a white paint having a linseed oil base, gives a coating which dries in 1½ hours and which, when exposed to weather influences, exhibits no cracking and no modification of colour after 6 months.

Varnish coatings obtained in accordance with each of the above examples can safely be washed with detergents and alkaline washing agents.

I claim:

1. Compositions suitable for use as protective varnishes, which comprise
   (a) 30–60% by weight of at least one organopolysiloxane resin having a mean numerical ratio of hydrocarbon groups to silicon atoms of 1.2–1.6 said hydrocarbon groups being selected from the class consisting of alkyl groups of 1 to 4 carbon atoms and phenyl group, and containing an average of 0.5–2.5% of hydroxyl groups, reckoned on the dry resin, (b) 1–25% by weight of at least one siliceous ester selected from the group which consists of the methyl and ethyl esters of monomeric and polymerised orthosilicic acid, (c) 1–20% by weight of at least one ester selected from the group which consists of the organic solvent-soluble alkyl esters of titanic and zirconic acids in which the alkyl group contains 2 to 18 carbon atoms and organic solvent-soluble condensation products of these esters with acetic acid and acetic anhydride, (d) at least 15% of a solvent for all of components (a), (b) and (c) selected from the grouping consisting of mineral spirits and benzene hydrocarbons.

2. Compositions suitable for use as protective varnishes, which comprise (a) 30–60% by weight of at least one organopolysiloxane resin having a mean numerical ratio of hydrocarbon groups to silicon atoms of 1.2–1.6 said hydrocarbon groups being selected from the class consisting of alkyl groups of 1 to 4 carbon atoms and phenyl groups and containing an average of 0.5–2.5% of hydroxyl groups, reckoned on the dry resin, (b) 5–15% by weight of at least one siliceous ester selected from the group which consists of the methyl and ethyl esters of monomeric and polymerised orthosilicic acid, in which the ratio of alkoxy groups to silicon atoms is 2.3–4, (c) 1–20% by weight of at least one ester selected from the group which consists of the organic solvent-soluble alkyl esters of titanic and zirconic acids in which the alkyl group contains 2 to 18 carbon atoms and organic solvent-soluble condensation products of these esters, (d) at least 15% of a solvent for all of components (a), (b) and (c) selected from the group consisting of mineral spirits and benzene hydrocarbons.

3. Compositions according to claim 1, including up to 20% of zinc 2-ethyl-hexanoate.

4. Compositions according to claim 2, including up to 20% by weight of zinc 2-ethyl-hexanoate.

5. Painted article having a hardened protective coating formed from the composition of claim 1.

References Cited in the file of this patent
UNITED STATES PATENTS

| | | |
|---|---|---|
| 2,687,388 | McNulty et al. | Aug. 24, 1954 |
| 2,721,855 | Kin | Oct. 25, 1955 |
| 2,728,736 | Hunter et al. | Dec. 25, 1955 |
| 2,807,601 | Dennett | Sept. 24, 1957 |